United States Patent [19]
Hasan et al.

[11] Patent Number: 5,139,379
[45] Date of Patent: Aug. 18, 1992

[54] ROOFING FASTENER, IMPROVED SCREW THEREFOR, AND IMPROVED WASHER THEREFOR

[75] Inventors: Syed R. Hasan; Craig A. Hindman; Ernest S. Santi, all of Palatine; Juergen O. Rathgeber, Arlington Heights; John R. Beach, Elmhurst, all of Ill.

[73] Assignee: Illinois Tool Works Inc., Glenview, Ill.

[21] Appl. No.: 604,459

[22] Filed: Oct. 29, 1990

[51] Int. Cl.⁵ .............................................. F16B 33/00
[52] U.S. Cl. .................................. 411/368; 411/371; 411/531
[58] Field of Search ............... 411/368, 369, 372, 371, 411/531, 542, 544, 533, 396, 184, 185, 186, 189, 373, 545, 154, 155, 156, 963, 161, 424, 188, 187; 52/410, 512

[56] References Cited

U.S. PATENT DOCUMENTS

| | | | |
|---|---|---|---|
| 1,406,423 | 2/1922 | Smith | 411/963 X |
| 3,357,064 | 12/1967 | Munse | 411/970 X |
| 3,782,437 | 1/1974 | Seckerson | 411/107 |
| 4,763,456 | 8/1988 | Giannuzzi | 411/133 X |
| 4,881,861 | 11/1989 | Hewison | 52/410 X |

FOREIGN PATENT DOCUMENTS

| | | | |
|---|---|---|---|
| 530534 | 9/1956 | Canada | 411/155 |
| 1160971 | 3/1958 | France | 411/155 |
| 325235 | 2/1930 | United Kingdom | 411/337 |
| 2086517 | 5/1982 | United Kingdom | 411/371 |

Primary Examiner—Rodney M. Lindsey
Attorney, Agent, or Firm—Schwartz & Weinrieb

[57] ABSTRACT

An improved composite fastener comprised of an improved roofing screw and a roofing washer and useful to fasten a blanket of roofing insulation to a soft substrate. The screw shank has a leading portion and a locking portion. The locking portion has two locking tabs. The washer has an aperture with a margin coacting with the screw when it is driven through the washer. The screw becomes locked to such washer when the screw is driven sufficiently for its head to bear against the washer at which time the locking tabs engage the undersurface of the washer.

22 Claims, 2 Drawing Sheets

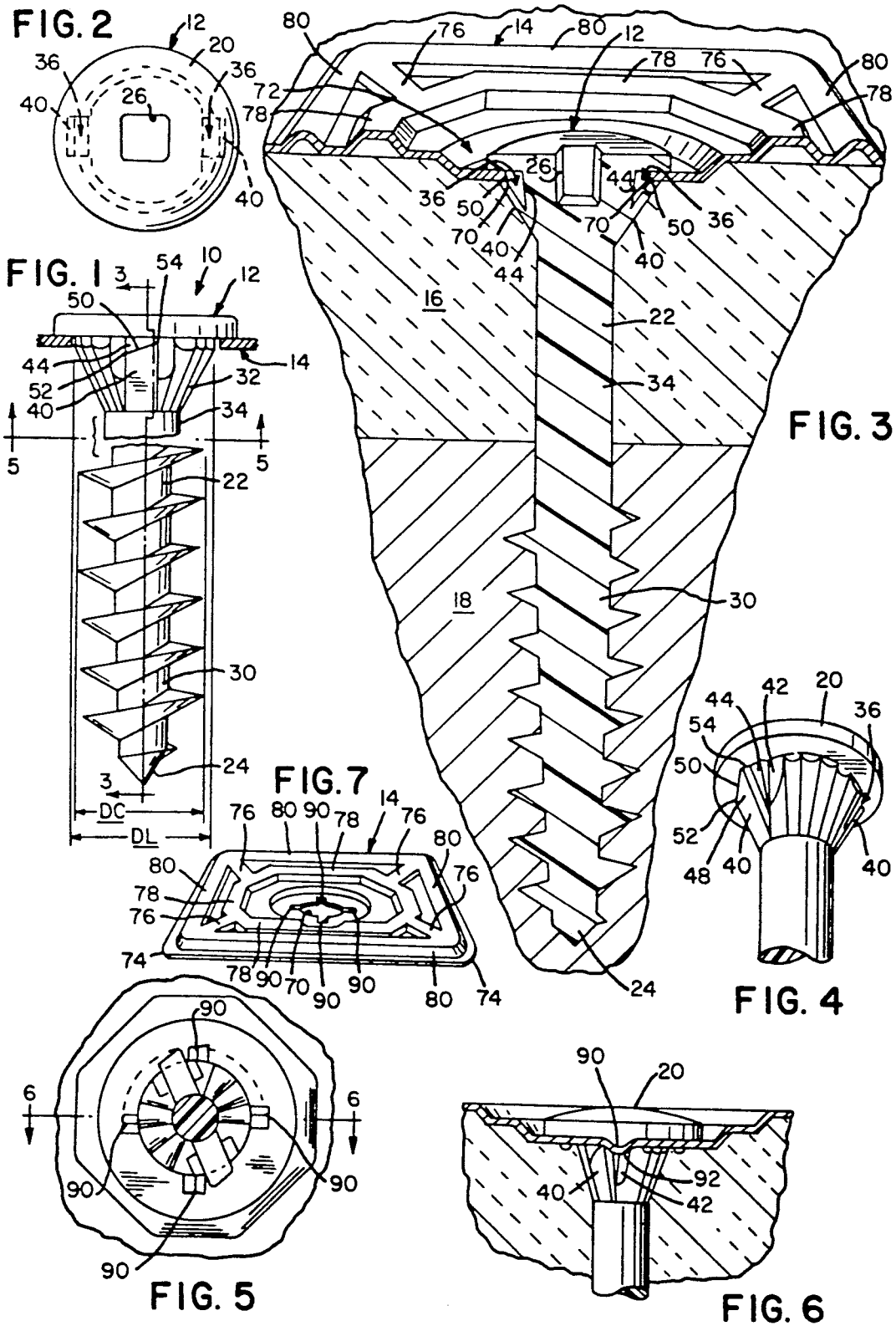

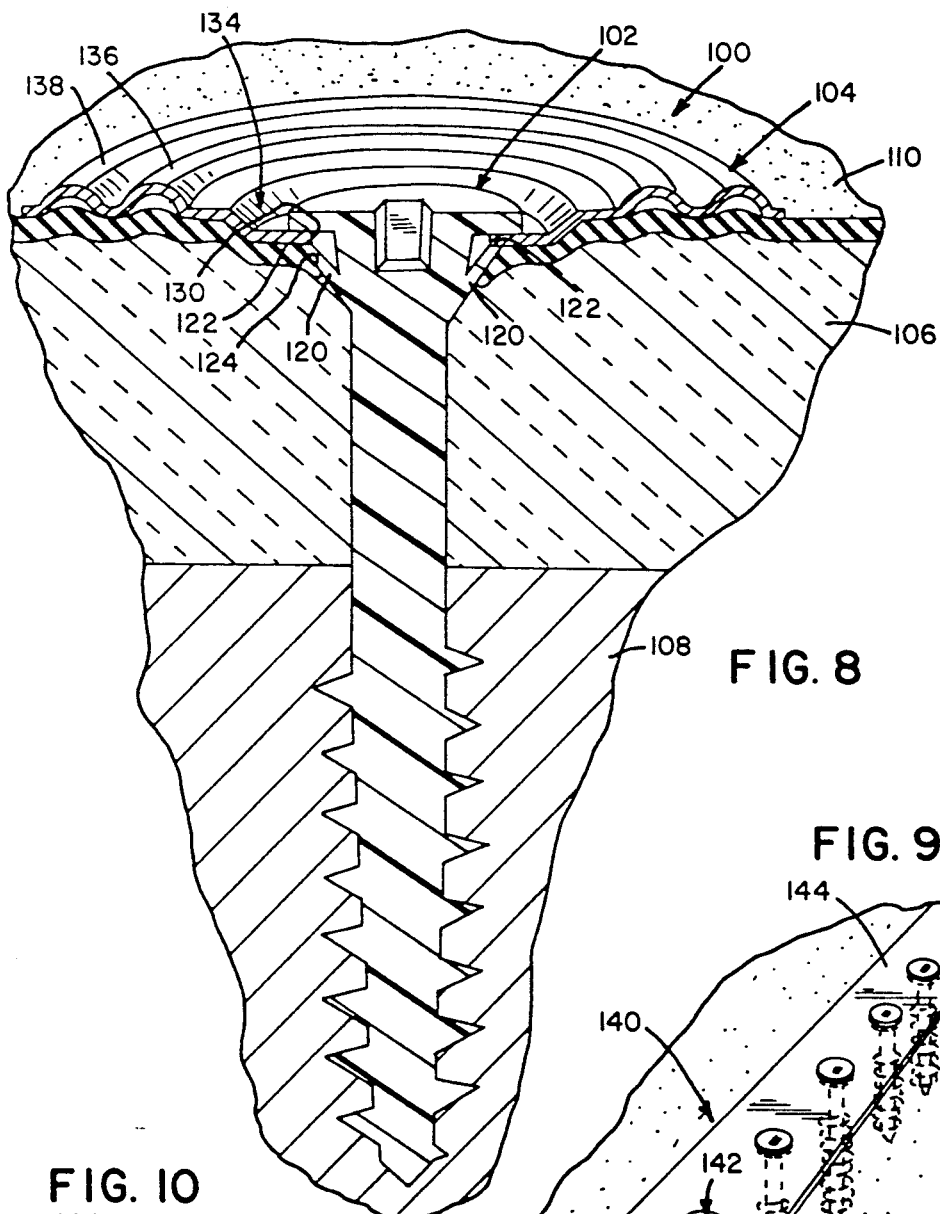
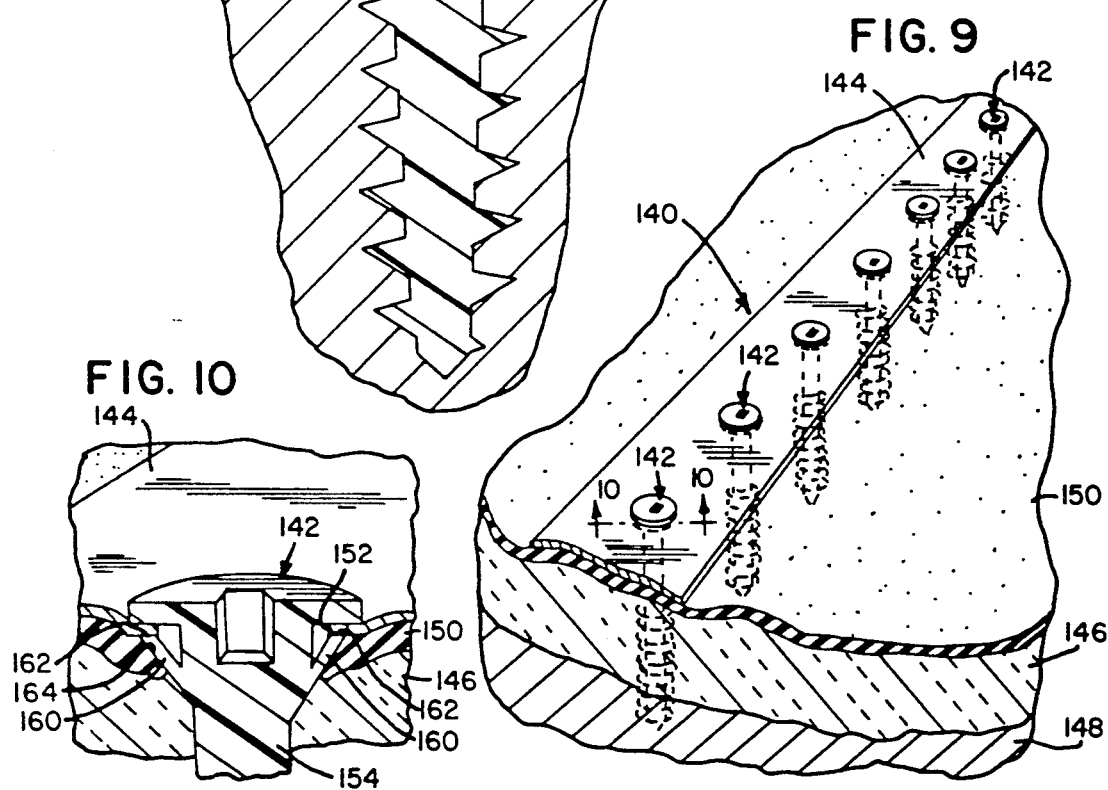

ROOFING FASTENER, IMPROVED SCREW THEREFOR, AND IMPROVED WASHER THEREFOR

TECHNICAL FIELD OF THE INVENTION

This invention pertains to a fastener comprising a roofing screw and a roofing washer to which the roofing screw becomes locked and which is useful to fasten a blanket of roofing insulation to a roofing substrate. A roofing batten is substitutable for the roofing washer.

BACKGROUND OF THE INVENTION

Soft, poured substrates of gypsum-based materials, which may be disposed over gypsum boards or other boards, or which may be formed wood fiber-filled, inorganic, hydraulic cement are used widely in roofing installations. Materials for such substrates formed of gypsum-based materials, and used over gypsum boards or other boards, are available commercially from various sources. Materials for such substrates formed of wood fiber-filled, inorganic, hydraulic cement are available commercially from Tectum, Inc., of Newark, Ohio, under its TECTUM TM trademark.

In fastening blankets of roofing insulation, such as, for example, rigid slabs of fibrous insulation or of foamed insulation, to such substrates, possibly with other roofing materials therebetween, fastening assemblies of a type disclosed in Blucher et al. U.S. Pat. Nos. 4,642,012 and 4,856,951 are widely used. Such fastening assemblies are available commercially from ITW Buildex (a division of Illinois Tool Works Inc.) of Itasca, Ill., under its GYPTEC TM trademark.

Typically, as disclosed within each of the aforementioned patents, such a fastening assembly utilizes four separate pieces, namely an elongate screw having threads at one end of its shank and having a head, an anchoring element attached to the threaded end of the screw shank, a washer between the screw head and the anchoring element, and a plate. The plate may also be called a roofing washer. The threaded end of the shank of the screw is threaded into an axial bore of the anchoring element. The anchoring element has external threads designed to be highly resistant to pull-out from a soft substrate. The plate is disposed between the washer and a rigid slab of roofing insulation when the screw is threadedly engaged so as to drive the anchoring element.

Giannuzzi U.S. Pat. Nos. 4,763,456 and 4,892,429 contain similar disclosures of a fastening assembly employing a screw having a generally uniform crest diameter and a progressively tapered root diameter, along with a roofing washer. Bidwell U.S. Pat. No. 74,489 discloses a similar screw having a generally uniform crest diameter and a progressively tapered root diameter.

Although fastening assemblies of the type disclosed in the Blucher et al. patents noted above are satisfactory in many applications, there has been a need, to which this invention is addressed, for an improved fastener useful where such fastening assemblies are employed.

SUMMARY OF THE INVENTION

This invention provides an improved fastener combining an improved screw with a roofing washer or with a roofing batten and being particularly useful but not exclusively to fasten a blanket or roofing insulation to a substrate. The improved screw becomes locked to the roofing washer or the roofing batten. The blanket or roofing insulation may be a rigid slab of fibrous insulation or foamed insulation. The substrate may be a soft substrate, such as, for example, a poured substrate of gypsum-based materials, which may be disposed over a gypsum board or another board, or a wood fiber-filled, inorganic, hydraulic cement. Sometimes, a roofing membrane is employed, which overlies the blanket of roofing insulation. Moreover, other roofing materials may be fastened between the blanket of roofing insulation and the substrate.

Broadly, in accordance with a preferred embodiment, the improved fastener utilizes an improved screw and a roofing washer, which may be substantially similar to the plate disclosed in each of the aforenoted patents. The improved screw is similar to known screws in that it has a head, a shank, and a tip, the shank extending between the head and the tip and defining an axis. However, the improved screw has various novel features, as explained below.

According to this invention, the improved screw is made of a resilient, thermoplastic material, such as, for example, glass-reinforced nylon. The shank has a leading portion adjoining the tip and a locking portion adjoining the leading portion. The leading portion is threaded so as to define a maximum crest diameter, preferably a uniform crest diameter over substantially the entire axial length of the leading portion. The locking portion includes one or more locking tabs, preferably two locking tabs in diametrical opposition with respect to each other. Each locking tab extends outwardly in a normal position and is capable of flexing inwardly from the normal position to a flexed position. In its normal position, each locking tab extends beyond the maximum crest diameter defined by means of the leading portion.

Preferably, a distal edge of each locking tab is bevelled in such a manner that one end of the distal edge is closer to the tip, as compared to its other end, and that its closer end leads its other end when the roofing screw is rotatably driven. Moreover, it is preferred, that the distal edge is rounded so as to be substantially semi-cylindrical between its aforenoted ends, which may be rounded so as to be substantially blunt.

In its flexed position, each locking tab fits within an imaginary cylinder, which is coaxial with the shank, and which has a diameter which is approximately equal to the maximum crest diameter defined by means of the leading portion.

Thus, when the improved screw is combined with a roofing washer, such screw becomes locked to such washer by means of such locking tab or locking tabs. Such washer has an aperture, which has a margin configured so as to coact with such screw when such screw is driven through such washer. Thus, the margin coacts therewith by allowing the leading portion of the screw shank to be thus driven through the aperture. Also, the margin coacts therewith by flexing each locking tab from its normal position to its flexed position, in such a manner that such locking tab can pass through the aperture, when such screw is driven sufficiently for the locking portion to extend through the aperture, and by allowing each locking tab to flex back toward its normal position when such screw is driven sufficiently for its head to be nearly contiguous with or to bear against such washer.

Preferably, the roofing washer has a novel, rotation-limiting feature, which coacts with the locking tab. If the roofing screw has two locking tabs, the roofing washer may have four of such features spaced equiangularly around the aperture. Each rotation-limiting feature coacts with one locking tab so as to limit relative rotation of the roofing screw and the roofing washer after the locking tab has flexed back toward the normal position when such screw has been driven sufficiently for its head to be nearly contiguous with or to bear against such washer. Moreover, it is preferred that the roofing washer comprises sheet metal, which is deformed so as to define four diametrically opposed nubs constituting such features.

Furthermore, it is preferred that the distal edge of each locking tab is bevelled in such a manner that one end of such edge is closer to the tip, as compared to its other end, and that the closer end leads the other end when the roofing screw is rotatably driven. The distal edge of each locking tab may also be rounded so as to be substantially semi-cylindrical between its aforenoted ends, which are then rounded so as to be substantially blunt.

BRIEF DESCRIPTION OF THE DRAWINGS

These and other object features, and advantages of this invention will be evident from the following description of a preferred embodiment of this invention, with reference to the accompanying drawings, in which like reference characters designate like or corresponding parts throughout the several views, and wherein:

FIG. 1 is a shortened, elevational view of a roofing screw constructed according to this invention. A roofing washer used therewith is shown fragmentarily.

FIG. 2 is an end a plan view of the roofing screw, as rotated by means of one quarter-turn about its axis. The roofing washer is omitted.

FIG. 3 is a perspective view taken in axial section through the roofing screw and the roofing washer, as used to fasten a blanket of roofing insulation to a substrate, in accordance with a preferred embodiment.

FIG. 4 is a fragmentary, perspective view of the roofing screw, a seen from its underside.

FIG. 5, on a smaller scale, is a fragmentary, sectional view taken along line 5—5 of FIG. 1, in the direction indicated by means of the arrows.

FIG. 6, on a slightly larger scale, is a sectional view taken along line 6—6 of FIG. 5, in the direction indicated by means of the arrows.

FIG. 7 is a smaller, perspective view of the roofing washer shown in FIGS. 1, 3, 5, and 6.

FIG. 8 is a perspective view taken in axial section through a roofing screw similar to the roofing screw shown in prior views, and through a roofing washer differing from the roofing washer shown in prior views, as used to fasten a roofing membrane and a blanket of roofing insulation to a substrate, in accordance with one alternate embodiment of the present invention.

FIG. 9 is a fragmentary, perspective view of a series of screws similar to the roofing screw shown in prior views and a roofing batten, as used to fasten a roofing membrane and a blanket of roofing insulation to a substrate in accordance with another alternate embodiment of the present invention.

FIG. 10, on a larger scale, is a fragmentary, perspective view taken in axial section through one of the roofing screws, and through the roofing batten, along line 10—10 of FIG. 9, in the direction indicated by means of the arrows.

DETAILED DESCRIPTION OF ILLUSTRATED EMBODIMENTS

Although a preferred embodiment of this invention and two alternate embodiments are illustrated in the drawings and are to be hereinafter described, it is to be here understood that the illustrated embodiments are only exemplary and that this invention is not necessarily limited to any of such embodiments.

As shown in FIGS. 1 through 7, a composite fastener 10 constituting a preferred embodiment of this invention is comprised of two pieces, namely a roofing screw 12 having features characteristic of this invention and a roofing washer 14. The composite fastener 10 is shown, in FIG. 3, as used to fasten a blanket 16 of roofing insulation to a substrate 18 with possibly other roofing materials (not shown) interposed between the blanket 16 and the substrate 18.

The blanket 16 of roofing insulation may be a rigid slab, as shown, of fibrous insulation or of foamed insulation. The substrate 18 may be a soft substrate, as shown, such as, for example, a poured substrate of gypsum-based material, which may be disposed over gypsum board (not shown) or other board, or of wood fiber-filled, inorganic, hydraulic cement.

The screw 12 has a head 20, a shank 22, and a tip 24. The head 20 is formed with a socket 26, which is generally square in cross-section, and which is adapted to coact with a driving tool (not shown) of a known type, such as, for example, a screw gun. The tip 24 is pointed, as shown, so as to cut through the blanket 16 of roofing insulation and into the substrate 18 when the screw 12 is rotatably driven.

The shank 22 has a leading or threaded portion 30 adjacent to the tip 24, a locking portion 32 adjacent to the head 20, and an unthreaded portion 34 between the threaded portion 30 and the locking portion 32.

The threaded portion 30 is threaded with sharp crests and flat roots, as shown, so as to define a maximum crest diameter (DC) which is uniform crest diameter along substantially all of its axial length, except near the tip 24, and wherein there is also defined a root diameter which decreases progressively toward the tip 24 from a maximum root diameter where the threaded portion 30 merges with the unthreaded portion. The unthreaded portion 34 has a uniform diameter which is approximately equal to the maximum root diameter of the threaded portion 30.

Optimally, as shown in FIG. 3, the axial lengths of the respective threaded, unthreaded, and locking portions of the shank 22 are such that the threaded portion 30 becomes fully embedded within in the substrate 18 when the composite fastener 10 is used to fasten the blanket 16 of roofing insulation to the substrate 18.

The locking portion 32 has a convexly ribbed surface with a frusto-conical shape, except for two regions 36 in diametric opposition with respect to each other, and except for two locking tabs 40. Each region 36 is defined by means of two flat surfaces 42 extending axially, in parallel relation with respect to each other, and by means of a wedge-shaped rib 44 interposed between the flat surfaces 42 of such region 36.

Each locking tab 40 is elongate and extends outwardly toward the head 20, across one of the regions 36, when such locking tab 40 is unstressed. Each locking tab 40 has a distal end 48 and is capable of flexing inwardly from a normal position to a flexed position. In its normal position, as shown, each locking tab 40 extends beyond the crest diameter defined by means of the threaded portion 30. In its flexed position, each locking tab 40 is flexed toward one of the wedge-shaped ribs 44 and fits within an imaginary cylinder, which is coaxial with the shank 22, and which has a diameter not substantially exceeding the crest diameter defined by means of the thread portion 30.

Each locking tab 40 has a distal edge 50, which is bevelled in such a manner that one end 52 of the distal edge 50 is closer to the tip 24, as compared to the other end 54 of the distal edge 50, and that the closer end 52 leads the other end 54 when the screw is rotatably driven. The distal edge 50 is rounded so as to be substantially semi-cylindrical between its opposite ends 52, 54, which are rounded so as to be substantially blunt.

A preferred material for the screw 12, which can be molded therefrom, is 33% glass-reinforced NYLON 6/6. The screw 12 may alternatively be machined from a suitable steel, which may be heat-treated (after it has been machined) so as to impart a spring characteristic to the locking tabs 40.

The roofing washer 14, which is similar to known roofing washers except for its rotation-limiting features to be later described, is stamped from a sheet of galvanized steel so as to have a circular, central aperture 70, in a countersunk socket 72, so as to be substantially square with rounded corners 74, and so as to have reinforcing ribs including diagonal reinforcing ribs 76, a reinforcing rib 78 surrounding the countersunk socket 72, and a peripheral reinforcing rib 80. The circular, central aperture 70 has a cylindrical margin, which has a diameter larger than the diameter (DL) of the roofing screw 12 where the locking portion 32 meets the head 20 and smaller than the diameter of the head 20.

The roofing washer has four rotation-limiting features, each of which coacts with one locking tab 40 of the screw 12 so as to limit relative rotation of the roofing screw 12 and the roofing washer 14 after the locking tab 40 has flexed back toward the normal position of the locking tab 40 when the roofing screw 12 has been driven sufficiently for the head 20 to be nearly contiguous with or to bear against the roofing washer 14. The roofing washer 14, which comprises sheet metal, is deformed near the margin of the circular, central aperture 70, so as to define four nubs 90 constituting such rotation-limiting, features. As shown in FIG. 5, the nubs 90 are spaced equiangularly (at 90° intervals) around the circular, central aperture 70. Each nub 90 has a bevelled surface 92, which conforms generally to the bevelled, distal edge 50 of each locking tab 40.

In the normal position of each locking tab 40, such locking tab 40 remains spaced from the head 20 by means of a distance that slightly exceeds the thickness of the roofing washer 14 at the cylindrical margin of the circular, central aperture 70. Moreover, when locking tabs 40 are in their normal positions, their distal edges 48 span a diametrical distance larger than the diameter of the cylindrical margin of the circular, central aperture 70 of the roofing washer 14.

Thus, when the roofing screw 12 is driven through the roofing washer 14, through the blanket 16 of roofing insulation, and into the substrate 18, the roofing screw 12 becomes locked to the roofing washer 14 by means of the locking tabs 40. The locking tabs 40 flex sufficiently so as to allow the locking tabs 40 to pass through the circular, central aperture 70, whereupon the locking tabs 40 flex back toward their normal positions so as to prevent the roofing screw 12 from withdrawing accidentally from such aperture 70. After the locking tabs 40 have flexed back toward their normal positions, their distal ends 48 may bear against the underside of the roofing washer 14, as shown in FIG. 3. Moreover, the nubs 90 coact with the locking tabs 40 so as to limit relative rotation of the roofing screw 12 and the roofing washer 14. Each locking tab 40 fits between two nubs 90.

As shown in FIG. 8, a composite fastener 100 constituting one alternate embodiment of this invention is comprised of two pieces, namely a roofing screw 102 similar to the roofing screw 12 and a roofing washer 104 differing in some respects from the roofing washer 14. The composite fastener 100 is shown as used to fasten a blanket 106 of roofing insulation to a substrate 108, with a roofing membrane 110 overlying the blanket 106 of roofing insulation, and with possibly other roofing materials (not shown) interposed between the blanket 106 and the substrate 108.

As in the preferred embodiment of FIGS. 1 through 7, the blanket 106 of roofing insulation may be a rigid slab of fibrous insulation or of foamed insulation. Likewise, the substrate 108 may be a poured substrate of gypsum-based material or of wood fiber-filled, inorganic, hydraulic cement. The roofing membrane 110 may be made of synthetic rubber or other material known for making a roofing membrane.

Being similar to the roofing screw 12, the roofing screw 102 has two locking tabs 120 similar to the locking tabs 40. Each locking tab 120 has a distal edge 122, which is rounded so as to be substantially semi-cylindrical between its opposite ends, and such ends are rounded so as to be substantially blunt. Because the distal edge 122 of each locking tab 120 is rounded so as to be substantially semi-cylindrical, and because its opposite ends are rounded so as to be substantially blunt, the distal edge 122 of each locking tab 120 can be disposed against the roofing membrane 110 with minimal risk of tearing the roofing membrane 110, and with minimal risk of enlarging such hole 124 as the roofing screw 102 cuts into the roofing membrane 110 when the roofing screw 102 is rotatably driven.

The roofing washer 104, which is similar to known roofing washers except possibly for rotation-limiting nubs discussed below, is stamped from a sheet of galvanized steel so as to have a circular, central aperture 130 within a countersunk socket 134, so as to be substantially circular, and so as to have annular reinforcing ribs, namely an inner reinforcing rib 136 and a peripheral reinforcing rib 138. The circular, central aperture 130 has a cylindrical margin, which is similar to the cylindrical margin of the circular, central aperture 70 of the roofing washer 14. The roofing washer 104 may be similarly deformed near the margin of the circular, central aperture 130, so as to define rotation-limiting nubs (not shown) similar to the rotation-limiting nubs 90 of the roofing washer 14.

Thus, when the roofing screw 102 is driven through the roofing washer 104, through the roofing membrane 110, through the blanket 106 of roofing insulation, and into the substrate 108, the roofing screw 102 becomes locked to the roofing washer 104 by means of the locking tabs 120. The locking tabs 120 flex sufficiently so as to allow the locking tabs 120 to pass through the circular, central aperture 130, whereupon the locking tabs 120 flex back toward their normal positions so as to prevent the roofing screw from withdrawing accidentally from such aperture 130. After the locking tabs 120 have flexed back toward their normal positions, their distal edges 122 may bear against the underside of the roofing washer 104, as shown. If the roofing washer 104 has rotation-limiting nubs similar to the rotation-limiting nubs 90 of the roofing washer 14, such nubs of the roofing washer 104 coact with the locking tabs 120 so as to limit relative rotation of the roofing screw 102 and the roofing washer 104.

As shown in FIGS. 9 and 10, a composite fastener 140 constituting another alternate embodiment of this invention is comprised of a series of roofing screws 142 similar to the roofing screw 12 and a roofing batten 144. The composite fastener 140 is shown as used to fasten a blanket 146 of roofing insulation to a substrate 148 with a roofing membrane 150 overlying the blanket 146 of roofing insulation, and possibly with other roofing materials (not shown) interposed between the blanket 146 and the substrate 148.

As in the aforenoted embodiments, the blanket 146 of roofing insulation may be a rigid slab of fibrous insulation or of foamed insulation. Likewise, the substrate 148 may be a poured substrate of gypsum-based material or of wood fiber-filled, inorganic, hydraulic cement. As in the alternate embodiment shown in FIG. 8, the roofing membrane 150 may be made of synthetic rubber or other material known for making a roofing membrane.

The roofing batten 144 is an elongate strip, which may have preformed, circular apertures 152 (see FIG. 10) so as to accommodate the shanks 154 of the roofing screws. The roofing batten 144 may be made of a polymeric material, such as, for example, poly(ethylene terephthalate) or polypropylene. Alternately, the roofing batten 144 may be made of galvanized steel, or another suitable metal.

Being similar to the roofing screw 12, each roofing screw 142 has two locking tabs 160 similar to the locking tabs 40. Each locking tab 160 has a distal edge 162, which is rounded so as to be substantially semi-cylindrical between its opposite ends and such ends are rounded so as to be substantially blunt. Because the distal edge 162 of each locking tab 160 is rounded so as to be substantially semi-cylindrical, and because its opposite ends are rounded so as to be substantially blunt, the distal edge 162 of each locking tab 160 can be disposed against the roofing membrane 150 with minimal risk of tearing the roofing membrane 150, and with minimal risk of enlarging such hole 164 (see FIG. 10) as such roofing screw 142 punctures or forms within the roofing membrane 150 when such roofing screw 142 is rotatably driven.

Thus, when each roofing screw 142 is driven through the roofing batten 144, through the roofing membrane 150, through the blanket 146 of roofing insulation, and into the substrate 148, the roofing screw 143 becomes locked to the roofing batten 144 by means of the locking tabs 160 of such roofing screw 142. Such locking tabs 160 flex sufficiently to allow such locking tabs 160 to pass through the preformed, circular aperture 152 accommodating such roofing screw 142, whereupon such locking tabs 160 flex back toward their normal positions so as to prevent such roofing screw 142 from withdrawing accidentally from such aperture 152. After such locking tabs 160 have flexed back toward their normal positions, their distal edges 162 may bear against the underside of the roofing batten 144, as shown in FIG. 10.

Various modifications may be made in any of the illustrated embodiments without departing from the scope and spirit of this invention. It is therefore to be understood that within the scope of the appended claims, the present invention may be practiced otherwise than as set forth in the foregoing specification.

We claim:

1. A roofing screw having a head, a shank, and a tip, and made from a resilient material, said shank extending between said head and said tip and defining longitudinal axis, said shank having a leading portion adjoining said tip and a locking portion adjoining said head, said leading portion being threaded so as to define a predetermined crest diameter, said locking portion including at least one locking tab, which in a normal position extends outwardly in a radial sense, beyond said predetermined crest diameter defined by said leading portion, and which is capable of flexing radially inwardly from said normal position to a flexed position wherein said locking tab is disposed within an imaginary cylinder which is coaxial with said shank and which has a diameter approximately equal to said predetermined crest diameter defined by said leading portion; and wherein said at least one locking tab has a distal edge with two opposite ends and is bevelled in such a manner that one of said ends is disposed closer to said tip, as compared to the other one of said ends, and that said closer end leads said other end when said screw is rotatably driven.

2. The roofing screw of claim 1 wherein the locking portion has two such tabs, in diametric opposition to each other.

3. The roofing screw of claim 2 wherein the leading portion has a generally uniform crest diameter defining the imaginary cylinder.

4. The roofing screw of claim 2 wherein the distal edge of each locking tab is rounded so as to be substantially semi-cylindrical between the opposite ends, which are rounded so as to be substantially blunt.

5. A composite fastener useful to fasten a blanket of roofing insulation to a substrate, comprising:

a roofing screw having a head, a shank, and a tip, and made from a resilient material, said shank extending between said head and said tip and defining a longitudinal axis, said shank having a leading portion adjoining said tip and a locking portion adjoining said head, said leading portion being threaded so as to define a predetermined crest diameter, said locking portion including at least one locking tab, which in a normal position extends outwardly beyond said predetermined crest diameter defined by said leading portion, and which is capable of flexing inwardly from said normal position to a flexed position wherein said locking tab is disposed within an imaginary cylinder which is coaxial with said shank and which has a diameter approximately equal to said predetermined crest diameter defined by said leading portion; and a roofing washer having an aperture, which has a margin configured so as to define means coacting with said roofing screw, when said roofing screw is driven through said roofing washer, by allowing said leading portion to be thus driven through said aperture, by flexing said locking tab from said normal position to said flexed position, such that said locking tab can pass through said aperture, when said roofing screw is driven sufficiently for said locking portion to extend through said aperture, and by allowing said locking tab to flex back toward said normal position when said roofing screw is driven sufficiently for said head to be substantially in contact with said roofing washer, whereby said roofing screw becomes axially locked to said roofing washer by said locking tab when said roofing screw is driven sufficiently for said head to be substantially in contact with said roofing washer while said locking tab engages an undersurface portion of said roofing washer;

said roofing washer having at least one rotation-limiting means formed upon said undersurface portion thereof for engaging said locking tab of said screw so as to prevent relative rotation of said roofing screw and said roofing washer after said locking tab has flexed back toward said normal position when said roofing screw has been driven sufficiently for said head to be substantially in contact with said roofing washer.

6. The composite washer of claim 5 wherein the locking portion has two such tabs, in diametric opposition to each other.

7. The composite washer of claim 5 wherein the roofing washer comprises sheet metal, which is deformed so as to define the rotation-limiting means.

8. The composite fastener of claim 5 wherein the roofing washer has four rotation-limiting means spaced regularly around the aperture, the rotation-limiting means coacting with the locking tabs to limit relative rotation of the roofing screw and the roofing washer after each locking tab has flexed back toward the normal position of such locking tab when the roofing screw has been driven sufficiently for the head to be substantially in contact with the roofing washer.

9. The composite washer of claim 8 wherein the roofing washer comprises sheet metal, which is deformed so as to define four diametrically opposed nubs constituting said rotation-limiting means.

10. The composite fastener of claim 8 wherein each locking tab has a distal edge with two opposite ends and is bevelled in such manner that one said end is closer to the tip, as compared to the other end, and that the closer end leads the other end when the screw is driven, and wherein each rotation-limiting means has a bevelled surface conforming generally to the bevelled, distal edge of each locking tab.

11. The composite fastener of claim 10 wherein the distal edge of each locking tab is rounded so as to be substantially semi-cylindrical between the opposite ends, which are rounded so as to be substantially blunt.

12. The composite fastener of claim 10 wherein the roofing washer comprises sheet metal, which is deformed so as to define four diametrically opposed nubs constituting the rotation-limiting means, each nub having a bevelled surface conforming generally to the bevelled, distal edge of each locking tab.

13. The composite fastener of claim 12 wherein the distal edge of each locking tab is rounded so as to be semi-cylindrical between the opposite ends, which are rounded so as to be substantially blunt.

14. A composite fastener useful to fasten a blanket of roofing insulation to a substrate, comprising:

a roofing screw having a head, a shank, and a tip, and made from a resilient material, said shank extending between said head and said tip and defining a longitudinal axis, said shank having a leading portion adjoining said tip and a locking portion adjoining said head, said leading portion being threaded so as to define a predetermined crest diameter, said locking portion including at least one locking tab, which in a normal position extends outwardly beyond said predetermined crest diameter defined by said leading portion, and which is capable of flexing inwardly from said normal position to a flexed position wherein said locking tab is disposed within an imaginary cylinder which is coaxial with said shank and which has a diameter approximately equal to said predetermined crest diameter defined by said leading portion; and a roofing batten having an aperture, which has a margin configured so as to define means coacting with said roofing screw, when said roofing screw is driven through said roofing batten, by allowing said leading portion to be thus driven through said aperture, by flexing said locking tab from said normal position to said flexed position, such that said locking tab can pass through said aperture, when said roofing screw is driven sufficiently for said locking portion to extend through said aperture, and by allowing said locking tab to flex back toward said normal position when said roofing screw is driven sufficiently for said head to be substantially in contact with said roofing batten, whereby said roofing screw becomes axially locked to said roofing batten, by said locking tab, when said roofing screw is driven sufficiently for said head to be substantially in contact with said roofing batten; and wherein said at least one locking tab has a distal edge with two opposite ends and is bevelled in such a manner that one of said ends is disposed closer to said tip, as compared to the other one of said ends, and that said closer end leads said other end when said screw is rotatably driven.

15. The composite fastener of claim 14 wherein the roofing screw has two such tabs, in diametric opposition to each other.

16. A washer to be used in connection with a screw, comprising:

a plate portion having upper surface means for engagement with a head portion of said screw, aperture means formed within said plate portion for permitting passage of a shank portion of said screw through said plate portion, undersurface means for engagement by at least one flexible locking tab formed upon said shank of said screw whereby said screw is axially locked within said washer once said at least one flexible locking tab has passed through said aperture means of said plate portion of said washer as said shank portion of said screw is passed through said aperture means of said plate portion and said head portion of said screw engages said upper surface means of said washer, and at least one rotation-limiting means formed upon said undersurface means of said plate portion for engaging said at least one flexible locking tab of said screw so as to prevent relative rotation of said screw and said washer.

17. The washer of claim 16 having plural rotation-limiting means near a margin of said aperture means.

18. The washer of claim 17 having four said rotation-limiting means, each having a bevelled surface.

19. A composite fastener, comprising:

a screw having a head, a shank defining a longitudinal axis, and a tip, said shank having a threaded portion extending from said tip toward said head and having a predetermined crest diameter, and at least one flexible locking tab which extends in a radially outwardly mode from said shank to a normally unstressed radial extent which is greater than said predetermined crest diameter of said threaded portion and which can be flexed radially inwardly to a flexed position having a radial extent which is substantially equal to said predetermined crest diameter of said threaded portion of said screw shank; and a planar member having an aperture which has a diametrical extent large enough to permit passage therethrough of said threaded shank portion of said screw but smaller than said head of said screw so as to prevent said head of said screw from passing through said plate member aperture, said at least one flexible locking tab of said screw being flexed radially inwardly from said normal, unstressed state as a result of said passage of said screw shank and said at least one flexible locking tab through said planar member aperture and resiliently returning to said normal unstressed state upon passage of said at least one flexible locking tab of said screw through said planar member aperture such that said at least one flexible locking tab of said screw engages an undersurface portion of said planar member so as to prevent axial withdrawal of said screw from said planar member, and said planar member further comprises at least one rotation-limiting means formed upon said undersurface portion thereof for engaging said at least one flexible locking tab of said screw so as to prevent relative rotation between said screw and said planar member.

20. A fastener as set forth in claim 19, wherein:
said planar member is a washer.

21. A fastener as set forth in claim 19, wherein:
said at least one locking tab comprises a pair of diametrically opposed locking tabs.

22. A fastener as set forth in claim 19, wherein:
said at least one rotation-limiting means of said planar member comprises four, equiangularly spaced nubs.

* * * * *